United States Patent [19]
Lavieville et al.

[11] Patent Number: 5,828,561
[45] Date of Patent: *Oct. 27, 1998

[54] MULTI LEVEL POWER CONVERTER WITH SELF-CORRECTING CAPACITOR CHARGE TIMING ADJUSTMENT

[75] Inventors: Jean-Paul Lavieville, Gif sur Yvette; Juan Gonzalez, St Arnoult en Yvelines, both of France

[73] Assignee: GEC Alsthom Transport SA, Paris, France

[ * ] Notice: The term of this patent shall not extend beyond the expiration date of Pat. No. 5,668,711.

[21] Appl. No.: 700,382
[22] PCT Filed: Dec. 28, 1995
[86] PCT No.: PCT/FR95/01750
§ 371 Date: Aug. 16, 1996
§ 102(e) Date: Aug. 16, 1996
[87] PCT Pub. No.: WO96/21269
PCT Pub. Date: Jul. 11, 1996

[30]     Foreign Application Priority Data

Dec. 29, 1994 [FR] France .................................. 94 15866

[51] Int. Cl.⁶ .............................. H02M 3/06; H02M 3/18
[52] U.S. Cl. ............................................. 363/62; 307/110
[58] Field of Search .................................. 363/59, 60, 61, 363/62; 307/109, 110; 320/1

[56]     References Cited

U.S. PATENT DOCUMENTS

| | | | |
|---|---|---|---|
| 4,137,464 | 1/1979 | Heller et al. | 307/227 |
| 4,578,772 | 3/1986 | Fujii | 363/62 |
| 4,621,227 | 11/1986 | Venema | 307/110 |
| 5,359,294 | 10/1994 | Ganger et al. | 363/62 |

*Primary Examiner*—Peter S. Wong
*Assistant Examiner*—Bao Q. Vu
*Attorney, Agent, or Firm*—Sughrue, Mion, Zinn, Macpeak & Seas, PLLC

[57]     ABSTRACT

A multilevel converter comprising, in particular, a capacitor (C1, C2, . . . , Cn) in each of its cells. The capacitors nominally have charge voltages proportional to their respective ranks in the converter. The converter also includes circuits (VMO1, VMO2, . . . , VMOn) for evaluating the mean voltage across the terminals of each of the capacitors (C1, C2, . . . , Cn), circuits (VE1, VE2, . . . , VEn) for measuring any difference that may occur with respect to each of the capacitors (C1, C2, . . . , Cn) between the evaluated mean charge voltage and the nominal mean charge voltage of the capacitor, and for providing a corresponding difference signal (VEC1, VEC2, . . . , VECn), and also correction control circuits (BT, EC1, EC2, . . . , ECn) receiving the difference signals and correspondingly causing at least one temporary coupling to be established between two capacitors in order to correct the difference.

9 Claims, 3 Drawing Sheets

MULTI LEVEL POWER CONVERTER WITH SELF-CORRECTING CAPACITOR CHARGE TIMING ADJUSTMENT

FIELD OF THE INVENTION

The present invention relates to electronic circuits for converting electrical energy of the type described in French application FR 2 679 715 A1, and to a power supply installation making use thereof.

DESCRIPTION OF THE PRIOR ART

The converter described in that patent application is shown, by way of example, in accompanying FIG. 1. It essentially comprises, between a voltage source SE and a current source C, a succession of controllable switching cells CL1, CL2, ..., CLn, each having two switches T1, T'1; T2, T'2; ... ; Tn, T'n, with one pole of each of the two-switches forming part of a pair of upstream poles and the other pole of each of the switches forming part of a pair of downstream poles, the pair of downstream poles of an upstream cell being connected to the pair of upstream poles of a downstream cell, and the pair of upstream poles of a first cell CL1 being connected to said current source C, while the pair of downstream poles of a last cell CLn is connected to said voltage source SE, the converter also comprising a respective capacitor C1, C2, ..., Cn for each cell, except that the capacitor of the last cell may be omitted when said voltage source SE is suitable for performing the same role, each capacitor is connected between the two poles constituting the pair of downstream poles of its cell, the converter further having control means (not shown) governing the nominal operation of the converter and acting on the switches of the successive cells in such a manner that the two switches of any one cell are always in respective opposite conduction states (represented by control links such as lcl), such that in response to a cell control signal delivered by said control means, one of the two switches in a given cell is successively in a first conduction state and then in a second conduction state during a cyclically repeated converter period, and such that in response to cell control signals that are identical but offset in time by a fraction of said converter period, the switches of successive cells function respectively in the same manner but offset in time by said fraction of a period.

Preferably, said fraction of a period is equal to the reciprocal of the number n of cells, i.e. $2\pi/n$, which is optimal with respect to harmonics generated on the output and which enables the voltages charged on the capacitors of the converter to be balanced naturally. Some other offset is nevertheless conceivable.

In such a converter, the successive capacitors C1, C2, ..., Cn have respective increasing mean charge voltages, the mean charge voltage of the capacitor associated with each of said cells being equal to the product of a voltage VE delivered by said voltage source SE multiplied by the reciprocal of the number of cells in the converter and by the rank of the cell, i.e. VE/3, 2VE/3, VE when n=3, i.e. when the converter has only three cells.

Naturally, the above applies to other values of n, providing n is not less than two.

The term "multilevel converter" is used below to designate a converter that satisfies the above description.

The object of the present invention is to make provision in such a multilevel converter for the charge on each capacitor to remain in compliance with the above description, in spite of inevitable departures from nominal operating conditions.

To examine more easily how the charge ought nominally to vary on one of the capacitors of a multilevel converter as described above, reference is made to FIG. 2 which shows an arbitrary switching cell CLk together with its switches Tk and T'k, the capacitor Ck associated with the cell, and also the following cell CLk+1 and its switches Tk+1 and T'k+1.

Given the coupling between the switches within each cell, Tk and T'k or Tk+1 and T'k+1, the set of two adjacent cells CLk and CLk+1 shown in FIG. 2 has four states:

a) a first state where Tk and Tk+1 are non-conducting, so the charge on Ck does not change;

b) a second stage where Tk and Tk+1 are both conducting, so the charge voltage on Ck does not change either, since under those circumstances T'k and T'k+1 are non-conducting;

c) a third state where Tk is conducting and Tk+1 is non-conducting, in which case the current source C forces a current Ik which is equal to I to flow through Tk while the current I'k through T'k is zero. It is the state of Tk+1 that forces the current Ik+1 to be zero, while the current I'k+1 is equal to I so the current I'ck through the capacitor Ck is equal to I; and d) a fourth state where Tk is non-conducting and Tk+1 is conducting, so the current source C forces a current I'k+1 equal to I through T'k while the current Ik through Tk is zero. The state of Tk+1 forces a current Ik+1 to be equal to I, while the current I'k+1 is zero, so the current Ick through the capacitor Ck is equal to I.

The currents I'ck=I'k+1 and Ick=Ik+1 deliver additional charge of opposite signs to the capacitor Ck in the above third and fourth states; the first situation is said to be negative and the second positive. The currents corresponding to these two states are forced by the current source. If the current source forces an exactly accurate DC, and everything else remains equal, then the currents forced by the current source during stages c) and d) are the same and in opposite directions at all times throughout the conduction periods of Tk and Tk+1 (which are nominally equal and offset in time, as mentioned above). This means that the charge on Ck is changed positively and then negatively by equal amounts, so it does not vary over one period of the converter.

The currents Ick and I'ck are determined by the voltage of the voltage source, the current through the current source, and the charge voltage Vck on capacitor Ck. In more general terms, when the impedance of the current source is not infinite, the current through the current source depends on the voltage across its terminals and thus on the voltages Vck on the capacitors. For example, if it should happen that the charge voltage Vck is higher than its nominal value VE×k/n, for whatever reason, then there will result a discharging current I'ck tending to be greater and a charging current Ick tending to be smaller than they ought to be nominally, thereby tending to return the charge on the capacitor Ck to the value it ought to have. This explains that the operation of the multilevel converter is stable and can accommodate variations in amplitude, in either direction, both at the voltage source and at the current source. It is explained below that this nevertheless gives rise to problems in dynamic terms.

FIG. 3 is an example of operation of the multilevel converter of FIGS. 1 and 2 for situation when n=3; pulse width modulation (PWM) type control is applied in order to deliver a sinusoidally modulated alternating voltage to the current source C, i.e., during successive periods p1, p2, p3, ... in the operation of the converter (line t), the switches T1, T2, and T3 are successively conductive during time intervals that vary in accordance with a wave for modulating the output voltage, referred to below as the "modulating" wave. At each instant, the corresponding switches T'1, T'2, and T'3 are in the opposite positions.

Naturally, other modes of modulating the operation of the switches make it possible to obtain the same result, as is well known. Also clearly, the converter may also serve to deliver the current source C with any other waveform or with a regulated DC voltage.

Consideration is given initially to the period p1 in the operation of the converter. During this period, while any one of the switches T1, T2, and T3 is conducting, the other two are non-conducting. For each set of two cells and the capacitor between them, this corresponds to above-described states c) and d), in which the capacitor receives successive additional negative and positive charge, with the total value thereof being nominally zero. It should also be observed that while the adjacent cells CL1 and CL2 are in state d), adjacent cells CL2 and CL3 are in state c) such that capacitor C1 receives additional positive charge from the same current that provides additional negative charge to capacitor C2.

FIG. 3 also shows, by way of example, how the multilevel converter operates during periods p2, p3, etc. . . . , during which the conduction periods of the switches T1, T2, T3 become shorter, and then become longer until they exceed one-third of a period, in which case they overlap. Line VI shows the voltage that would ideally be transmitted to the current source, in particular if the capacitance of the capacitors was such that the additional charge in question did not significantly alter the voltage across their terminals. The voltage VI is expressed in fractions of the voltage VE from the voltage source SE, taking the negative pole of the voltage source SE as the voltage reference. It can be seen that this voltage VI contains both a large fundamental at the frequency of the modulating wave, and also lower-amplitude harmonics at frequencies higher than the chopper frequency which are easily eliminated by a lowpass filter.

Since the current varies sinusoidally, states c) and d) mentioned above will not convey equal additional amounts of charge to the capacitors of the converter, since between the above two states, the current will have had time to vary. Such variation is negligible only if the operating period of the switches is significantly greater than the frequency of the modulating wave.

It should also be expected that the AC supplied to the current source will not be exactly sinusoidal, but will be distorted in an asymmetrical manner. Likewise, errors in the levels of the control signals or in the signals they generate, or indeed differences in the switching times of the various switches involved, inevitably cause switch conduction durations to be unequal over an operating period of the converter, or will shift the conduction stages of the switches in time, or else will unbalance the currents charging and discharging the capacitors. Consequently, and in general, it is not possible in practice with a multilevel converter of the type described to guarantee that nominal operating conditions as described initially will, in fact, be satisfied. Unfortunately, a persistent error in additional charge will lead to an error in one direction or the other in the charge on a capacitor, and thus to an error in its mean charge voltage, thereby giving rise to distortion at the operating frequency of the converter in the voltage delivered to the current source.

This effect is illustrated by trace VI' in FIG. 3 which is similar to trace VI with the exception that capacitor C1 (FIG. 1) which is assumed to be charged to a voltage that is smaller than its nominal charge voltage prevents the converter from delivering pulses vi1, vi2, vi3 of constant amplitude, with the converter supplying, instead, pulses such as vi1' that are of smaller amplitude (the scale is exaggerated to make it more readable) whenever the capacitor C1 is delivering its own charge voltage to the current source C, and pulses such as vi2' of greater amplitude whenever the capacitor C1 is subtracting its own voltage from the voltage delivered to the current source C, and finally also pulses such as vi3' of unchanged amplitude whenever the capacitor C1 is not in the circuit. It is thus easy to see that this introduces into the signal VI' a disturbing component at said frequency of the converter.

Such a disturbing component does not exist when the capacitors are charged to their respective nominal voltages. When such a component appears, it is generally harmful.

However, and above all, the voltages to which the switches are subjected are no longer substantially equal to the differences between the nominal charge voltages of two adjacent capacitors, i.e. the voltage of the voltage source divided by the number of stages in the converter. This can put the switches in danger.

Naturally, and as mentioned above, errors in charge on the capacitors tend spontaneously to be reabsorbed, but that process takes time.

In addition, the spontaneous process is implemented via the current source. It therefore cannot have effect when the current source is not forcing a current, and in any event it will be slowed down whenever the current flowing through the current source is small.

SUMMARY OF THE INVENTION

On the basis of the above observations, the present invention proposes a multilevel converter in which the mean charge on each capacitor of the converter is better maintained at its nominal value.

According to the invention, this result is achieved in that the multilevel converter comprises means for evaluating the mean voltage across the terminals of each capacitor, means for measuring any difference on each of said capacitors between the evaluated mean charge voltage and the nominal mean charge voltage of the capacitor, and for delivering corresponding difference signals, and correction controlling means receiving said difference signals and consequently controlling at least one temporary coupling between two capacitors in order to correct said difference.

In an embodiment, said correction control means comprise one correction circuit per capacitor under consideration in the converter, each of said circuits receiving one of said difference signals, together with an enabling signal from a time base, and responding thereto by delivering one of two charge transfer controlling signals for controlling connection of said capacitor under consideration respectively to an upstream circuit for discharging it and to a downstream circuit for recharging it.

Said upstream circuit includes the capacitor of immediately lower rank, if there is one.

Said downstream circuit includes the capacitor of immediately higher rank, if there is one.

Preferably, the presence of at least one of said difference signals causes a correction cycle to take place in which said time base enables said correction circuits in succession.

Advantageously, said differences give rise to a difference signal only if they exceed a predetermined threshold.

In an embodiment, the amplitude of one of said difference signals characterizes the magnitude of the difference and determines the duration of said correction signal.

In a variant, said correction signal is of predetermined fixed duration corresponding to a correction increment.

BRIEF DESCRIPTION OF THE DRAWINGS

The various objects and characteristics of the present invention appear more clearly in the following description of embodiments of the invention given by way of non-limiting example and made with reference to the accompanying figures, in which.

DESCRIPTION OF THE PREFERRED EMBODIMENT

Figure 2:
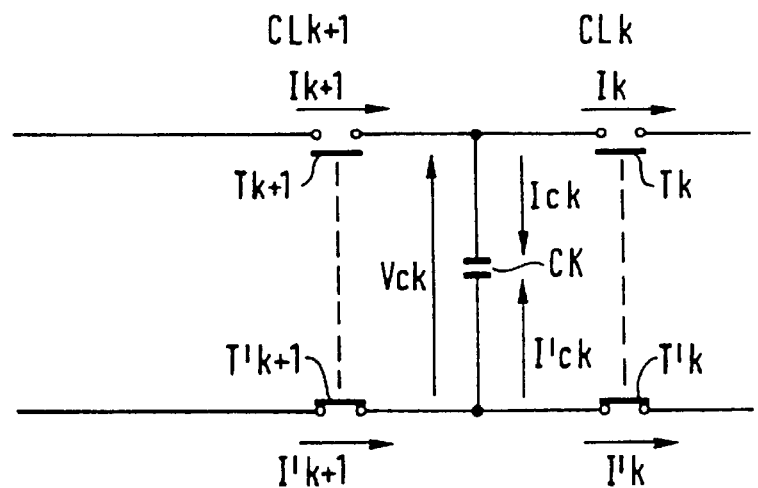
FIG. 2, described above, is the circuit diagram of a set of two adjacent stages in the multilevel converter of FIG. 1.
Figure 3:
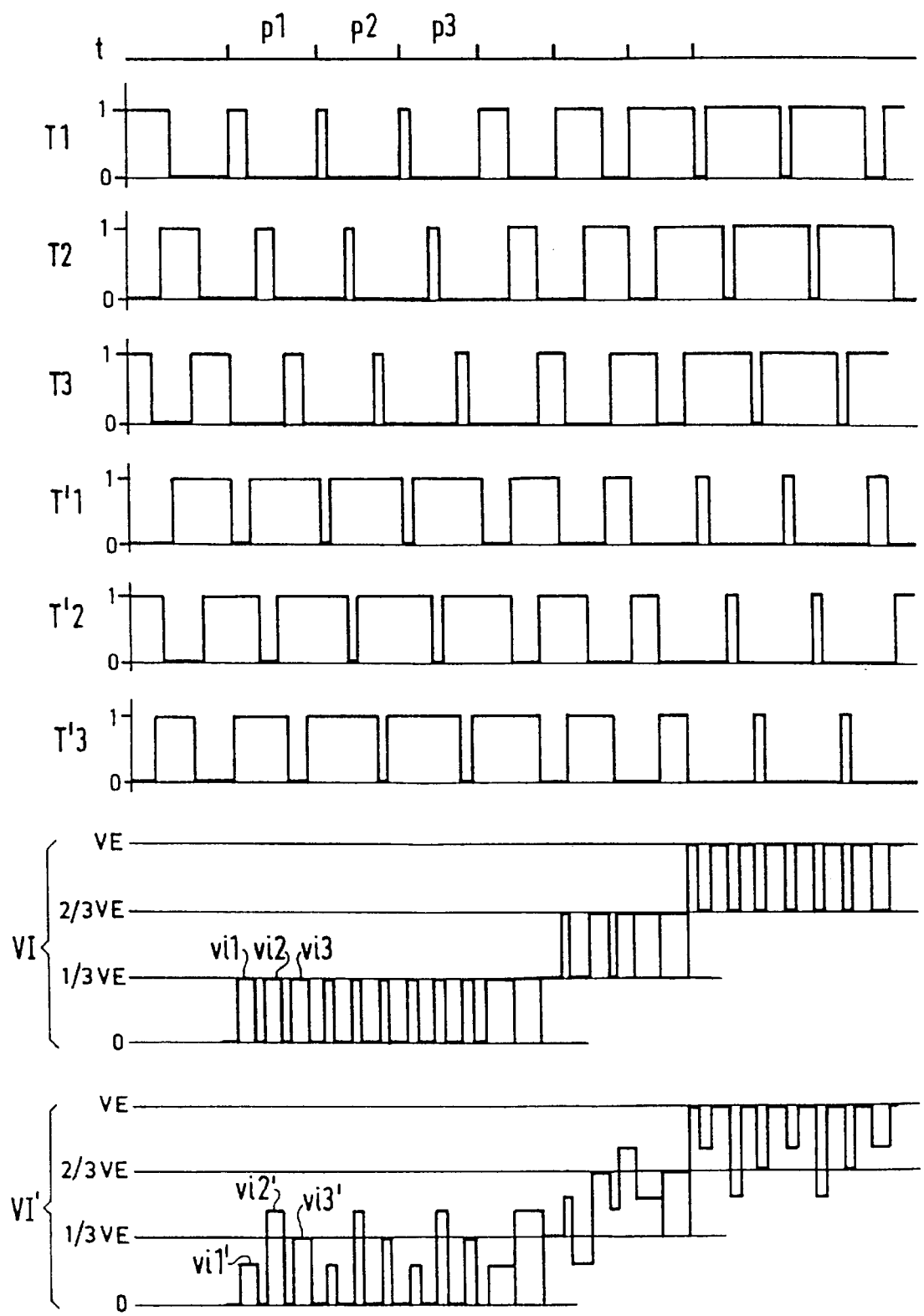
FIG. 3, described above, is a waveform diagram showing operation of the multilevel converter of FIGS. 1 and 2, for the case where it comprises three stages.

A multilevel converter is not described again. The diagrams of FIGS. 1, 2, and 3 correspond to a converter of the type described in patent document FR 2 697 715 A1 to which the reader is referred for more ample details.

Figure 1:
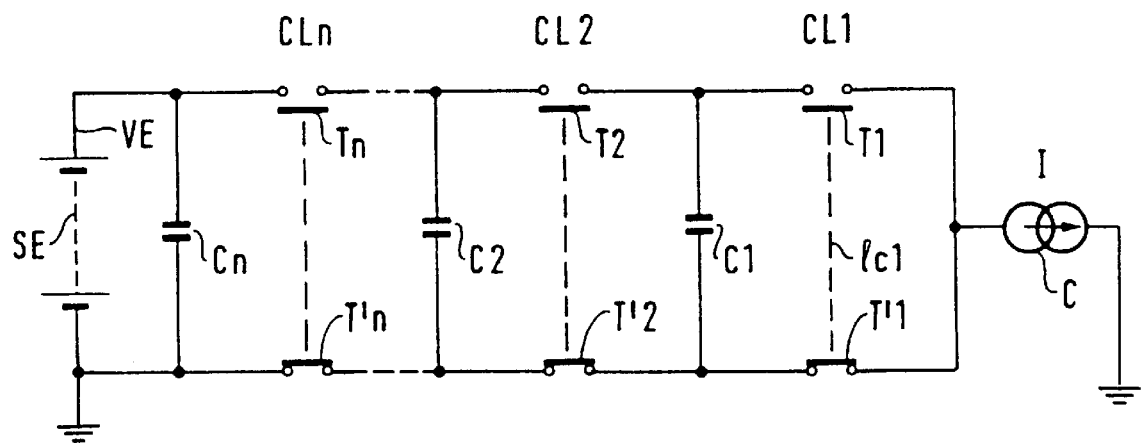
FIG. 1, described above, is the circuit diagram of a known multilevel converter.
Figure 4:
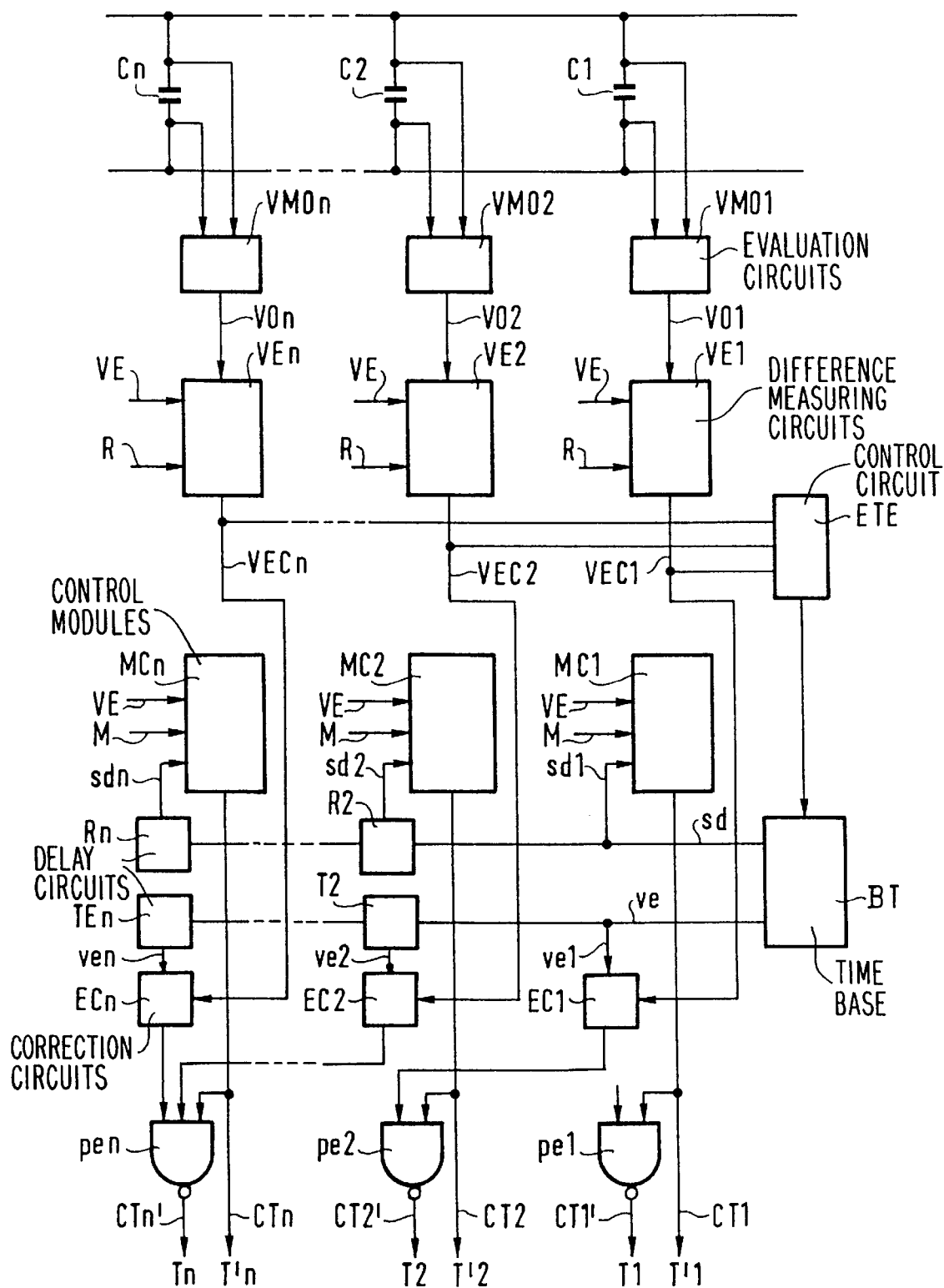
FIG. 4 is the circuit diagram of control means for a multilevel converter of the type shown in FIGS. 1, 2, and 3 and organized to enable the invention to be implemented.

Only the capacitors C1, C2, ..., Cn of the FIG. 1 converter are shown in FIG. 4.

Each of these capacitors is associated, in the invention, with an evaluation circuit VMO1, VMO2, ..., VMOn for evaluating the mean charge voltage on each capacitor. To this end, each evaluation circuit is coupled to the two terminals of the corresponding capacitor. It delivers an evaluation signal VO1, VO2, ... VOn representative of the mean charge voltage existing across the terminals of the capacitor.

Figure 5:
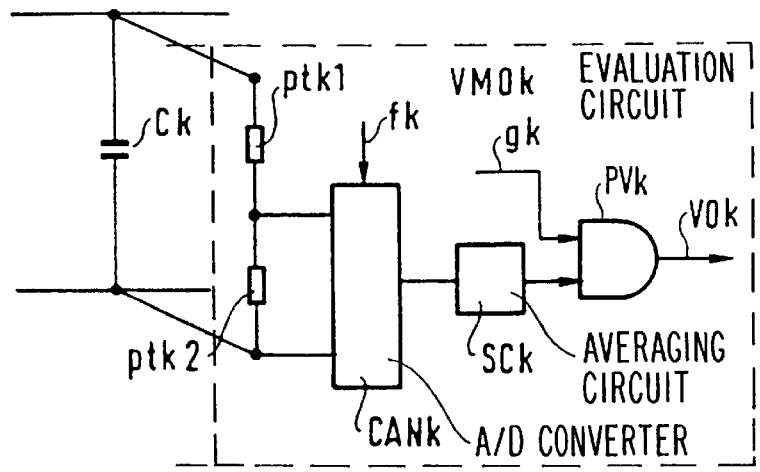
FIG. 5 is a circuit diagram of means for evaluating the charge voltage on a capacitor and suitable for use in the circuit of FIG. 4.

With reference to FIG. 5, an evaluation circuit is constituted, in one embodiment, by impedances ptk1 and ptk2 connected in series across the terminals of the capacitor Ck, and delivering a determined fraction of the voltage across the terminals of the capacitor to an analog-to-digital converter ADC which functions on each pulse fkn to deliver a digital voltage value to an averaging circuit SCk which is read once per converter cycle by a gate circuit PVk which is triggered by a signal gk. The signals fk and gk are advantageously produced by a time base BT (FIG. 4) and their positions in the operating period of the converter are such that after m measurements of the voltage in the operating period of the converter, and after computing the mean of the results of said measurement, the value for the observed mean charge voltage is made available on the output VOk of the circuit SCk, once per operating period of the converter at the moment appropriate for determining possible errors in capacitor charge, as explained below.

Each of these capacitors is also associated, in the invention, with a difference-measuring circuit VE1, VE2, ..., VEn for measuring any difference that may exist between the absorbed mean charge voltage as received from the corresponding evaluation circuit, and the nominal mean charge voltage for the capacitor. The difference-measuring circuit itself computes the nominal mean charge voltage of the capacitor as the fraction 1/n where n is the number of stages in the converter of the voltage VE of the voltage source SE, multiplied by the rank R of the stage. The circuit thus receives the values VE and R, while the value n which is a constant for the converter as a whole is hard-wired in each circuit (the value R which is constant for each stage could likewise be hard-wired). The circuit derives therefrom the nominal mean charge voltage VE×R/n and compares it with the evaluated mean charge voltage to deliver a difference signal VEC1, VEC2, ..., VECn, representative of the difference between these two voltages. However, in a variant, the difference signal may be a simple logic signal (on two bits) representing solely the presence of a difference and its sign. Advantageously, and for reasons explained below, the difference signal is provided only if the capacitor charge difference exceeds a predetermined threshold, which threshold is hard-wired in the difference-measuring circuit.

The control means of FIG. 4 also include control modules MC1, MC2, ..., MCn. These control modules operate in response to a signal sd produced by the time base BT during each period, such as p1 (FIG. 3), and from which there are derived trigger signals sd1, sd2, ..., sdn that are mutually offset by a fraction of the period by means of delay units R2, ..., Rn, thereby controlling the switching cells of the converter in offset manner. The essential function of the control modules MC1, MC2, ..., MCn is to produce, during each period, a control pulse that takes the signal CT1, CT2, ..., CTn to its active level, for a nominal duration that is determined by the value VE of the voltage provided by the voltage source and by the value M of the modulation signal.

Each of these active level control pulses is applied directly to a respective one of the switches T'1, T'2, ..., T'n to cause it to be non-conductive, and each pulse is also delivered to a respective NOR gate pe1, pe2, ..., pen which then delivers the opposite or "inactive" level to cause the respective switches T1, T2, ..., Tn to be conductive, and regardless of the levels on the other input of the NOR gate. The states of the switches are shown with these references in FIG. 3 (0=non-conductive, 1=conductive).

The difference signals are intended to act on correction control means comprising the time base BT, and correction circuits EC1, EC2, ..., ECn, each belonging to a respective capacitor of the converter, these circuits receiving said difference signals and correspondingly controlling at least one temporary coupling between two capacitors in order to eliminate said difference.

In the present case, each of these circuits receives a difference signal VEC1, VEC2, ..., VECn, together with an enable signal ve from the time base BT, and responds by providing one of two charge transfer controlling signals CR1, CR1'; CR2, CR2'; ... ; CRn, CRn', one of which is intended to cause the capacitor in question C1, C2, ..., Cn to be connected to an upstream circuit to discharge it, and the other of which is intended to connect the capacitor to a downstream circuit to recharge it.

Taking the capacitor C1 as an example, the corresponding correction circuit EC1, when enabled (how it is enabled is explained below), and providing it receives an error signal (representative of an error exceeding a predetermined threshold), delivers the charge transfer controlling signal CR1 if the capacitor has too much charge, or else the charge transfer controlling signal CR' if the capacitor does not have sufficient charge.

Taking the case initially of the capacitor C1 having too much charge, an active level signal CR1 causes the output of the gate pe1 to take the inactive level, and as a result causes the switch T1 to become conductive. It can be seen (FIG. 1) that in this way, since the switch T'1 is also conductive (because the signal CT1 is inactive, in particular due to the absence of any signal sd), the capacitor Cl is short circuited via the switches T1 and T'1. Since this short circuit includes lengths of wiring, it is inevitably inductive, and as a result, given that the charge transfer controlling signal C1 is very short (a few microseconds), a calibrated reduction in charge on the capacitor is obtained. Provision may be made for its duration to be related to the amplitude of the error signal if the error signal does indeed represent the magnitude of the error. Under such circumstances, it is necessary to take into consideration the current I flowing through the current source which is added to the discharge of the capacitor C1. However, in a variant that is simpler to implement, it is also possible to provide for said duration being constant and short, in which case adjustment of the charge on the capacitor takes place in a plurality of steps. Under such circumstances, the steps are small enough to ensure that after a final correction the charge error that remains is smaller than said predetermined threshold.

If consideration is now given to capacitor C2 instead of capacitor C1, then operation is the same, with the charge transfer controlling signal directly connecting the capacitor C2 to the capacitor C1 via the switches T2 and T'2. The difference between the charge voltages of the two capacitors is equal to the charge of capacitor C1. There is thus, initially, a short circuit involving the same physical magnitudes. Nevertheless, the charge taken from capacitor C2 is then transferred to the capacitor C1, thereby raising the voltage across its terminals and consequently limiting the transfer of charge from C2 to C1. The duration of charge transfer therefore needs to be increased (more or less doubled, assuming that voltage excursion is small compared with the charge voltage of the capacitors). Also, the charge transferred to capacitor C1 constitutes excess charge therein; it will therefore give rise to a charge voltage error being observed and consequently being corrected as described above. The current I of the current source also has an effect, as explained above. The same applies to all of the stages of the converter.

The case is now considered of the capacitor C1 being insufficiently charged, so the signal CR'1 acts on the gate pe2 which delivers the inactive level and consequently causes the switch T2 to conduct. The charge transfer controlling signal CR1' thus directly connects the capacitor C1 to the capacitor C2 so that charge is transferred from the capacitor C2 to the capacitor C1, as described above. Nevertheless, this correction of the charge on capacitor C1 also generates an error in the charge on the capacitor C2, which error will subsequently be corrected in the manner described above, and so on.

A circuit ECn is shown, but since there are no switches Tn+1, Tn+1', it does not have an output CRn'.

To organize the operation of the correction circuits, provision is made in the embodiment of FIG. 4 for the presence of at least one of said difference signals VEC1, VEC2, ..., VECn, as detected by an OR type circuit ETE to act on the time base BT to cause it to generate a correction cycle that takes place between two periods of the converter. During the correction cycle, the time base BT produces a signal ve which directly constitutes the signal ve1 enabling correction circuit EC1, and then produces the signals ve2, ..., ven that successively enable the other correction circuits EC2, ..., ECn by means of delay circuits T2, ..., Tn in cascade.

Thus, when a difference is detected, and generally only one is detected at a time, a correction cycle takes place. If the correction cycle gives rise to an error in an adjacent capacitor in the converter, then another cycle takes place thereafter; provision may advantageously be made for a minimum pause between such cycles by organizing the time base appropriately. By time offsetting correction operations relating to successive capacitors in the converter, it is possible for a plurality of differences observed at the same time to be corrected in a single cycle.

Naturally the above descriptions are given purely by way of non-limiting example and the numerical values in particular can change in each application. The invention also extends to a power supply installation using a multilevel converter as described above. Similarly, the description relates to a voltage source that provides a positive voltage relative to a reference voltage or ground, with the charge on the capacitors being biased in the same direction, and with current flowing from the positive pole of the voltage source towards the current source. It is also clear that the person skilled in the art can adapt the invention to cases where polarities are different.

We claim:

1. A multilevel converter comprising, in particular, between a voltage source (SE) and a current source (C), a succession of controllable switching cells (CL1, CL2, ..., CLn), each having two switches (T1, T'1; T2, T'2; ...; Tn, T'n), with one pole of each of the two switches forming part of a pair of upstream poles and with the other pole of each of the switches forming one of a pair of downstream poles, the pair of downstream poles of an upstream cell being connected to the pair of upstream poles of a downstream cell, and the pair of upstream poles of a first cell (CL1) being connected to said current source (C) while the pair of downstream poles of a last cell (CLn) is connected to said voltage source (SE), the converter further comprising a capacitor (C1, C2, ..., Cn) for each cell, except that the capacitor of the last cell may be omitted when said voltage source (SE) is suitable for performing the same role, each capacitor being connected between the two poles constituting the pair of downstream poles of the corresponding cell, the converter also comprising control means governing the nominal operation of the converter by acting on the switches of successive cells in such a manner that the two switches of any given cell are always in respective opposite conduction states, such that in response to a cell control signal (CT1, CT2, ..., CTn) provided by said control means, one of the two switches in a given cell is successively in a first conduction state and then in a second conduction state during a cyclically repeated period, and such that in response to cell control signals that are identical but offset in time by a fraction of said period the switches of successive cells operate respectively in the same manner but offset in time by said fraction of a period, the successive capacitors (C1, C2, ..., Cn) having respective increasing nominal mean charge voltages, the nominal mean charge voltage of the capacitor in each of said cells being equal to the product of a voltage (VE) from said voltage source (SE) multiplied by the reciprocal of the number of cells and by the rank of the cell, the converter being characterized in that it comprises means (VMO1, VMO2, ..., VMOn) for evaluating the mean voltage across the terminals of each capacitor (C1, C2, ..., Cn), means (VE1, VE2, ..., VEn) for measuring any difference on each of said capacitors (C1, C2, ..., Cn) between the evaluated mean charge voltage and the nominal mean charge voltage of the capacitor, and for delivering corresponding difference signals (VEC1, VEC2, ..., VECn), and correction controlling means (BT, EC1, EC2, ..., ECn) receiving said difference signals and consequently controlling at least one temporary coupling between two capacitors in order to correct said difference.

2. A multilevel converter according to claim 1, characterized in that said correction control means comprise one correction circuit (EC1, EC2, . . . , ECn) per capacitor under consideration in the converter, each of said circuits receiving one of said difference signals (VEC1, VEC2, . . . , VECn), together with an enabling signal from a time base (BT), and responding thereto by delivering one of two charge transfer controlling signals (CR1, CR1'; CR2, CR2'; . . . ; CRn, CRn') for controlling connection of said capacitor under consideration (C1, C2, . . . , Cn) respectively to an upstream circuit for discharging it and to a downstream circuit for recharging it.

3. A multilevel converter according to claim 2, characterized in that said upstream circuit includes the capacitor of immediately lower rank, if there is one.

4. A multilevel converter according to claim 2, characterized in that said downstream circuit includes the capacitor of immediately higher rank, if there is one.

5. A multilevel converter according to claim 1, characterized in that the presence of at least one of said difference signals causes a correction cycle to take place in which said time base enables said correction circuits (EC1, EC2, . . . , ECn) in succession.

6. A multilevel converter according to claim 1, characterized in that said differences give rise to a difference signal only if they exceed a predetermined threshold.

7. A multilevel converter according to claim 1, characterized in that the amplitude of one of said difference signals characterizes the magnitude of the difference and determines the duration of said correction signal.

8. A multilevel converter according to claim 1, characterized in that said correction signal is of predetermined fixed duration corresponding to a correction increment.

9. A power supply installation incorporating a multilevel converter according to claim 1.

* * * * *